(12) United States Patent
Karman et al.

(10) Patent No.: US 8,493,379 B2
(45) Date of Patent: Jul. 23, 2013

(54) METHOD OF IDENTIFYING PATTERN IN A SERIES OF DATA

(75) Inventors: Gerardus Petrus Karman, 'S-Gravenhage (NL); Daniel Willem Elisabeth Schobben, Eindhoven (NL); Peter-Andre Redert, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 1012 days.

(21) Appl. No.: 12/097,575

(22) PCT Filed: Dec. 8, 2006

(86) PCT No.: PCT/IB2006/054675
§ 371 (c)(1),
(2), (4) Date: Jun. 16, 2008

(87) PCT Pub. No.: WO2007/072270
PCT Pub. Date: Jun. 28, 2007

(65) Prior Publication Data
US 2009/0027384 A1    Jan. 29, 2009

(30) Foreign Application Priority Data
Dec. 19, 2005  (EP) ...................................... 05112381

(51) Int. Cl.
*G06T 15/00*  (2006.01)
(52) U.S. Cl.
USPC ........................................................ 345/419

(58) Field of Classification Search
USPC ........................................................ 345/419
See application file for complete search history.

(56) References Cited

U.S. PATENT DOCUMENTS

| | | | |
|---|---|---|---|
| 6,031,564 A * | 2/2000 | Ma et al. .......................... | 348/43 |
| 6,275,254 B1 | 8/2001 | Beeteson et al. | |
| 6,295,070 B1 | 9/2001 | Wood | |
| 2002/0180731 A1 | 12/2002 | Lapidous et al. | |
| 2005/0089212 A1* | 4/2005 | Mashitani et al. ............ | 382/154 |
| 2005/0146788 A1 | 7/2005 | Costales | |

FOREIGN PATENT DOCUMENTS

| | | |
|---|---|---|
| EP | 0817123 A1 | 1/1998 |
| EP | 0963122 A2 | 12/1999 |
| EP | 1551189 A1 | 7/2005 |
| JP | 10040420 A | 2/1998 |
| JP | 2004007396 A | 1/2004 |
| JP | 2004165708 A | 6/2004 |
| WO | 9912127 A1 | 3/1999 |

* cited by examiner

*Primary Examiner* — Said Broome
*Assistant Examiner* — Peter Hoang (57) ABSTRACT

A method and device for generating and/or displaying 3D images include temporarily increasing the depth of content of an image or a part of an image to a high level and afterward the depth of content is decreased to a low level. This temporary increase of the depth of content renders a large 3D effect to the image or the part of the image to which it has been applied. The actual average depth of content can be made relatively low thus reducing fatigue, while the perceived depth of content is relatively high.

21 Claims, 6 Drawing Sheets

METHOD OF IDENTIFYING PATTERN IN A SERIES OF DATA

The invention relates to a 3D image display method and device.

The invention also relates to an image display data conversion method wherein 3D image data are converted into novel 3D image data.

The invention further relates to a 3D image signal.

The invention further relates to a computer program product to be loaded by a computer arrangement, comprising instructions to generate output 3D image data on basis of a 3D image data input, the computer arrangement comprising processing means.

A three-dimensional representation of graphics and video is one of the holy grails in the display field. Several methods have been devised which give the viewer the impression that he is looking at a 3-dimensional image. A 3D perception can be created in several manners. A three dimensional impression can be created by using stereo pairs (two different images directed at the two eyes of the viewer). There are several ways to produce stereo images. The images may be time multiplexed on a 2D display, but this requires that the viewers wear glasses with e.g. LCD shutters. When the stereo images are displayed at the same time, the images can be directed to the appropriate eye by using a head mounted display, or by using polarized glasses (the images are then produced with orthogonally polarized light). The glasses worn by the observer effectively route the views to each eye. Shutters in the glasses are synchronized to the frame rate to control the routing. A disadvantage with such as system is that the two images do not produce a "look around" capability, unless the position of the head is tracked and the views are adapted accordingly. Furthermore, glasses have to be worn to produce any effect. This is unpleasant for those observers who are not familiar with wearing glasses and a potential problem for those already wearing glasses, since the extra pair of glasses do not always fit.

Instead of near the viewers eyes, the two stereo images can also be split at the display screen by means of splitting screen such as a lenticular screen or a parallax barrier. E.g. in FIGS. 3 and 4 of U.S. Pat. No. 6,275,254 the principle is shown.

Although to view a 3D image significantly improves the sense of reality of the displayed images it has been reported that after some times viewers experience viewing fatigue and even headaches. This strongly reduces the attractiveness of 3D image devices and 3D imaging in general.

It is an object of the invention to improve 3D imaging methods and 3D game display devices by reducing the mentioned problem.

To this end the method in accordance the invention is characterized in the depth of content of the displayed image is temporarily set at a first depth content level, where after the depth of content is set at a second depth content level, lower than the first depth content level.

For displaying the images the pixel data are provided with data relating to the x and y position, i.e. the position in a plane parallel to the display screen, and depth data relating to a z-position, i.e. data indicating the position of a pixel or object perpendicular to the display plane, i.e. the depth.

The depth data is translated into a difference in image seen by the right and left eye, i.e. the parallax angle which gives the depth of content of the image, i.e. just how "deep" the 3D effect is perceived by the viewer. The image can be displayed such that the difference between the left and right eye images is only slight, in which case the depth of content of the displayed image is only small, i.e. there is only a small 3D optical effect, or the difference could be made larger, in which case there is large depth of content, i.e. a large 3D effect. The depth of content of the image or of any part of the image is given by the relation between the depth data, i.e. the z-values of pixels or object of the image, and the differences between of the images seen by the left and right eye, i.e. the parallax angle. In conventional devices this relation is a constant, i.e. the depth of content is stationary, it is fixed and permanent.

Present 3D display devices have the intrinsic property that only one plane is in focus for the viewer. This means that the viewer receives conflicting depth cues: the image disparity (difference in image for left and right eye) and eye accommodation cue never actually match. When the depth reproduction is relatively small (i.e. there is only small 3D effect) this does not present a problem, but for larger depth effects, viewing fatigue and even headaches result. What is not in focus is blurred and this causes fatigue to the eyes. This seems to present an insurmountable dilemma. One the one hand the stronger the 3D effect, the more attractive the 3D display device becomes in respect of conventional 2D displays, but on the other hand a strong 3D effect leads to viewing fatigue and possibly headaches, which effect could be reduced by reducing the 3D effect, i.e. the perceived depth in the image, but this would reduce the advantage of the 3D display device over a conventional 2D display device.

The invention reduces this dilemma. The depth of content of the displayed image or of a part of the image is temporarily set at a first depth content level, where after the depth of content is set at a second depth content level, lower than the first depth content level.

This allows the depth content of the image to be, on average, at a relatively low level. On average therefore the depth content is low, and a relatively small parallax angle is used, which reduce fatigue and headaches. Temporarily, in the meaning of lasting or intended to be used for a relatively short time only, increasing the depth content to a high level, increases the depth perception of the viewer. If this increased depth perception would only be perceived by the viewer during application of the increased depth the effect would be low. However, the increased depth perception remains at the relatively high level for some time after the actual depth content of the image has been reduced to a low level. In a sense, the eyes and brain of a viewer are tricked. Presenting an image with a high depth content, i.e. a large 3D effect, in a sense locks the perception of the viewer into believing he/she sees a picture with a high 3D effect. Even after reduction of the depth content, he/she still perceives the image as having a high depth content, even though in reality he/she is seeing an image with only a small 3D effect. Thus the effect of temporarily showing an image or a part of an image at a high depth content lingers on to well after application. In fact, experiments have shown that viewers do not see any or hardly any difference between displaying an image which has 100% of the time a large depth content, i.e. show a clear 3D effect, and images which intermittently have a large depth content, for instance $x_1$ second large depth content followed by $x_2$ seconds low or no depth content, wherein $x_1$ and $x_2$ are in the order of 0.1 to 10 seconds, where preferably $x_2$ is equal to or larger than $x_1$. Apparently even though at as substantial percentage of the time a "flat image" is shown, such images are not perceived to be different by the viewer from real 3D images in so far as 3D effect are concerned. In fact, intermittently high-low depth content provides for an overall somewhat sharper image, which is perceived favorably by the viewer.

Temporarily setting the depth content at a first, high level, is in embodiments done independent of the displayed image. In embodiments the depth of content is cyclically varied with a period in the order of 0.1 to 10 seconds, for instance x second large depth content followed by y seconds low or no depth content, wherein x and y are in the order of 0.1 to 10 seconds, where preferably y is equal to or larger than x. This is a simple scheme. The invention removes viewer fatigue by reducing the overall "3D load with conflicting 3D cues" on the viewer.

In an embodiment of the invention, the depth content is set at the first level in dependence of the displayed image, upon introduction of a cue comprised in the image data. A cue may be the introduction of a novel element into the movie or image, or change in scene. The cue may be deduced from the content of the image, or may be a label in the bit stream including any metadata associated with the image data as well as any image date per se. For instance, in a 3D video engine for computer games, depth information for all objects are known and novel object are labeled as such. The introduction of novel objects is then the cue which sets the depth of content of the image or the part of the image comprising the novel object to the first, relatively high level for a relatively short period of time, i.e. temporarily, where after the depth of content is set to the second, lower level. "Is set" is within the concept of the invention to be interpreted broadly, the transition between the first and second level may be, but need not be, instantaneously. There could be a fluent transition, wherein the change in the depth of content between the first and second level is gradual. In fact, this is preferred, since it gives better results. In these embodiments the enhanced 3D effect is presented when it is appreciated most, i.e. when new elements are introduced into the image. New elements could be a new scene, or new elements, such as a car driving into the scene. The 3D effect is by the viewer mentally associated with the new element or the change in scenery and will be perceived to persist, even if the actual 3D effect, i.e. the depth content itself, has decreased to a low level. This alternative embodiment is based on the same insight: Temporarily increasing the depth content of the displayed image 'tricks' the viewer into believing that, even when an image of lower 3D effect is subsequently shown, said image has a high depth content.

The image display device in accordance with the invention comprises means for performing the method steps in accordance with the invention.

The method of conversion comprises the method steps in accordance with the invention relating to conversion of input image data to output image data.

A converter comprises means for performing the methods steps corresponding with the method of conversion in accordance with the invention.

These and other objects of the invention will be apparent from and elucidated with reference to the embodiments described hereinafter.

In the drawings.

The Figures are not drawn to scale. Generally, identical components are denoted by the same reference numerals in the Figures.

Figure 1:
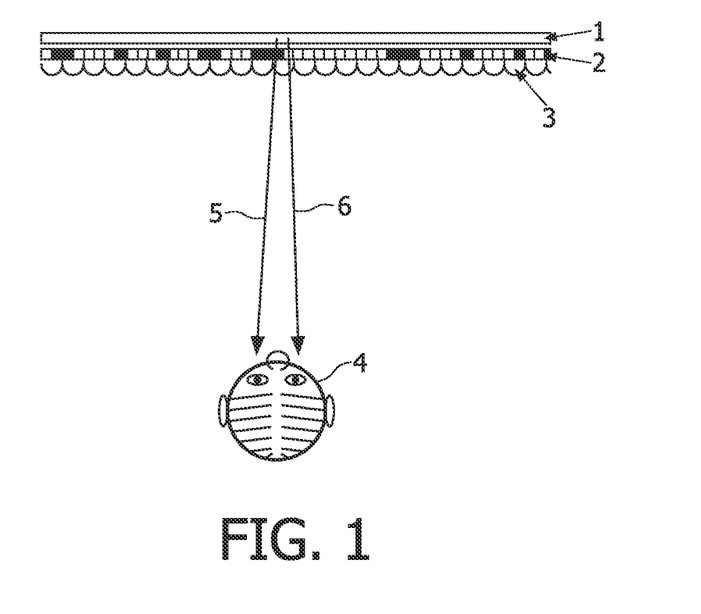
FIG. 1 illustrates the basic principle of a lenticular screen splitting two stereo images.

FIG. 1 illustrates the basic principle of a lenticular screen 3 splitting two stereo images 5 and 6. The vertical lines of two stereo images are (spatially) alternatingly displayed on, e.g., a spatial light modulator 2 (e.g. a LCD) with a backlight 1. Together the back light and the spatial light modulator form a pixel array. The lens structure of the lenticular screen 3 directs the stereo image to the appropriate eye of the viewer.

Figure 2:
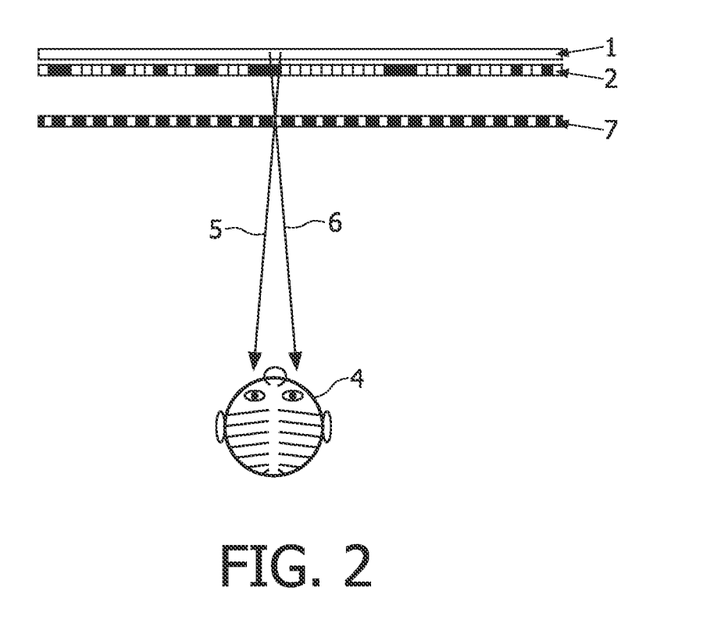
FIG. 2 illustrates the basic principle of a parallax barrier splitting two stereo images.

FIG. 2 illustrates the basic principle of a parallax barrier splitting two stereo images. The vertical lines of two stereo images are alternatingly displayed on, e.g., a spatial light modulator (e.g. a LCD) with a back light. The grating structure of the parallax barrier 7 ensures that each eye of the viewer 4 sees the appropriate stereo image (5, 6).

Figure 3A:
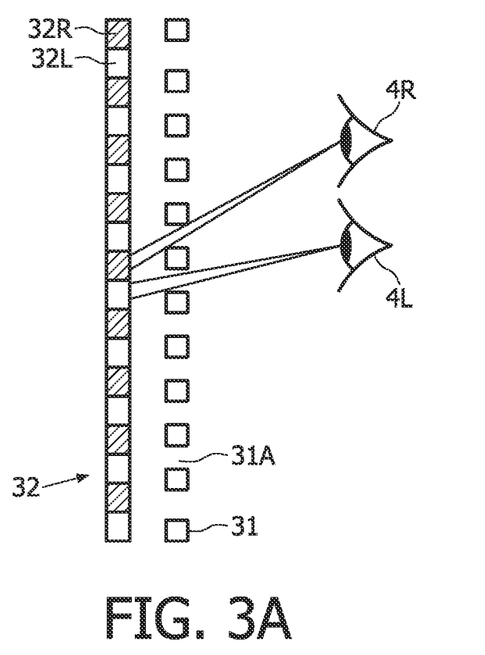
FIGS. 3A and 3B illustrate the two types of autostereoscopic display devices shown in FIGS. 1 and 2.
Figure 3B:
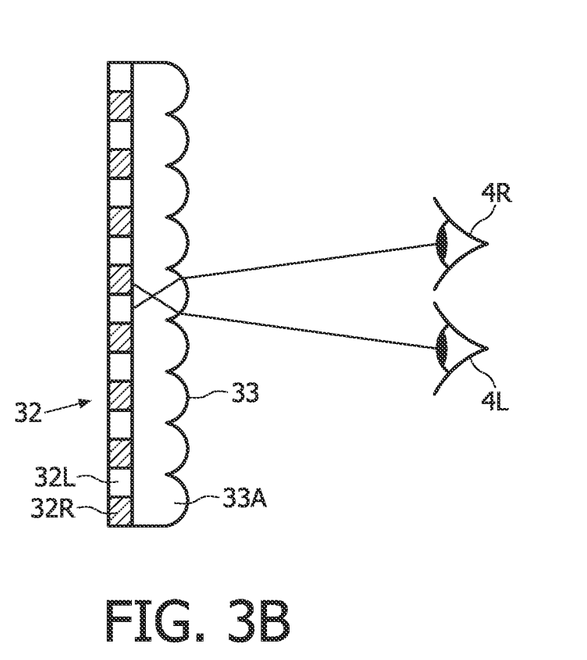

FIGS. 3A and 3B further illustrate the two types of autostereoscopic display devices as shown in FIGS. 1 and 2.

In a barrier auto-stereoscopic display system, a barrier 31 is disposed in front of a display array 32. The left and right images of a stereo pair of images are sliced into vertical strips. The strips 32L of the left image and the strips 32R of the right image are alternately disposed on array 32. Slots 31A are formed in barrier 31. Slots 31A are positioned so that the left eye 4L of an observer can see only strips 32L of the left image and the right eye 4R can see only strips 32R of the right image of the pair. The observer reconstructs the full image in three dimensions.

Referring now to FIG. 3B, barrier 31 is replaced by a lenticular lens screen 33 having an array of vertical cylindrical lenses 33A each corresponding to a different pair of left and right image strips 32L and 32R. In operation each lens directs the left eye 4L of an observer onto a left image strip 32L and the right eye 4R of the observer onto a right image strip 32R.

The amount of difference between the image presented to the left and right eye determines the perceived depth. If there is no difference between the image presented to the left and right eye the image is flat and there is no 3D effect. The amount of depth can be adjusted by changing the difference between the left and right image. Basically the viewer perceives different parts of the image on different planes, one behind the other.

An inherent property of 3D display devices is that only one plane is in focus for the viewer, almost always the plane that corresponds to the actual position of the display screen. This means that the viewer receives conflicting depth cues: the image disparity (difference in image for left and right eye) and eye accommodation cue (the eyes focus on the screen, while the eyes turn towards the observed object at a distance that is different from the distance to the screen) never actually match. When the depth reproduction is relatively small (i.e. there is only small 3D effect) this does not present a problem, since there is only a small depth difference and all parts of the image are, due to the small depth difference more or less in focus and the eyes can accommodate any difference. However, for larger depth effects, viewing fatigue and even headaches result. What is not in focus is blurred and this causes fatigue to the eyes. This seems to present an insurmountable dilemma. One the one hand the stronger the 3D effect, the more attractive the 3D display becomes in respect of conventional 2D displays, but on the other hand a strong 3D effect leads to viewing fatigue and possibly headaches, which effect could be reduced by reducing the 3D effect, i.e. the perceived depth in the image, but this would reduce the attractiveness of the 3D display.

Figure 4:
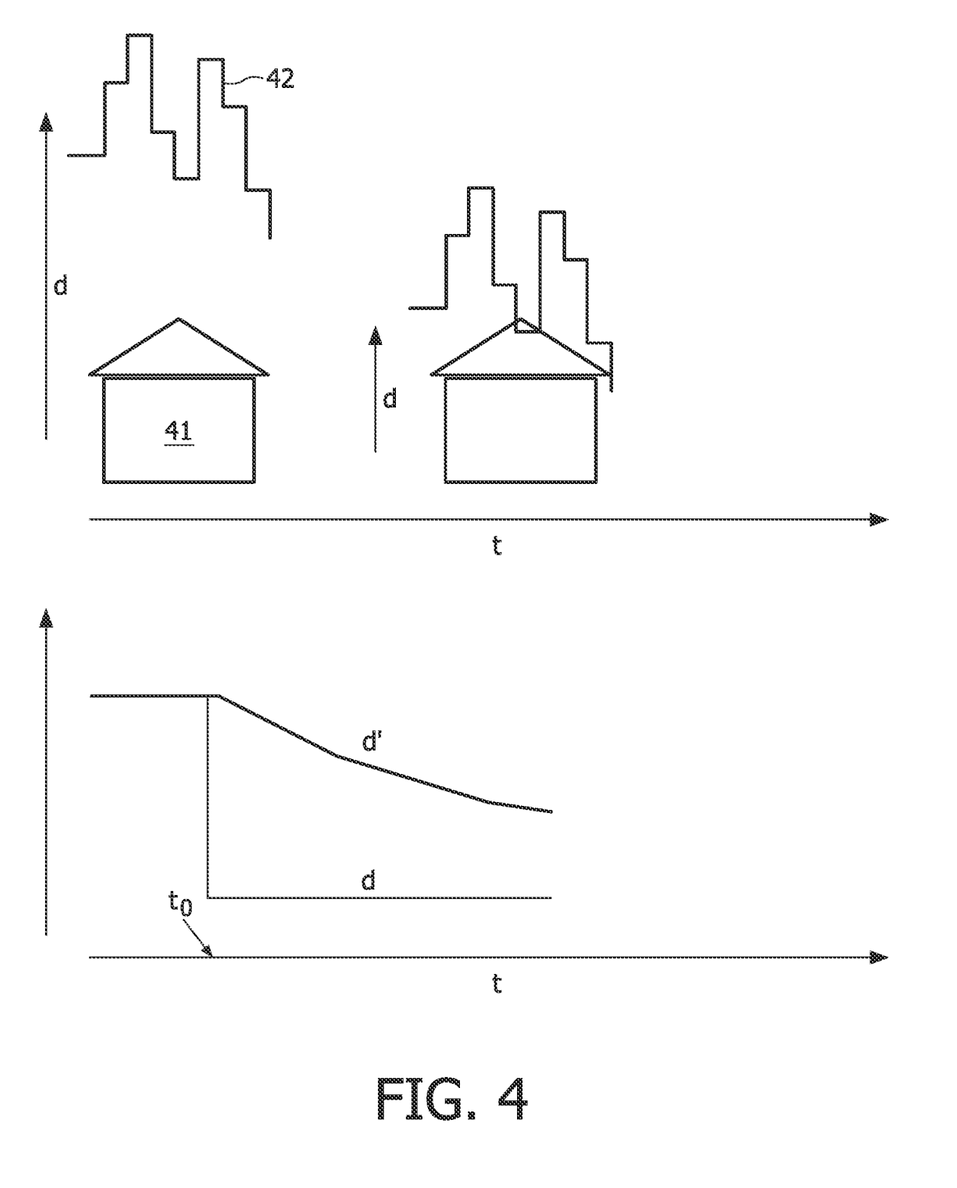
FIG. 4 illustrates the principle of the invention.
Figure 5:
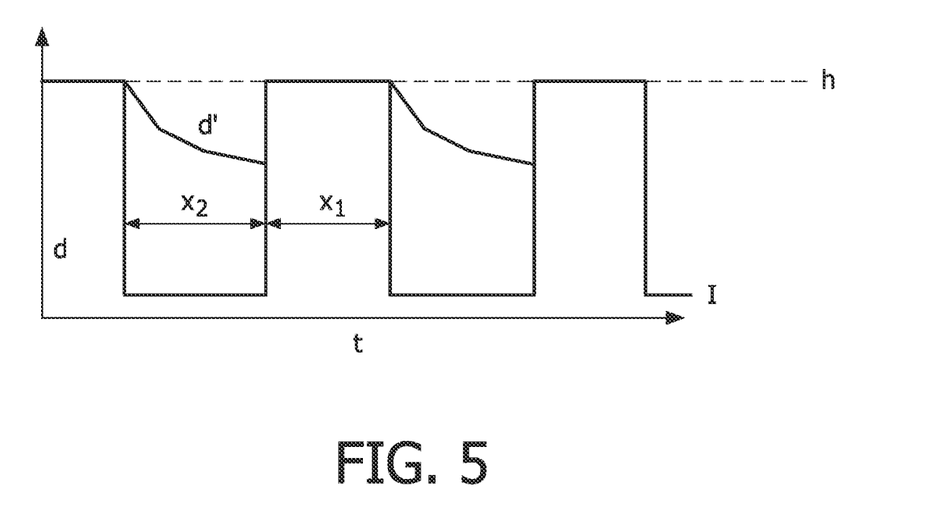
FIG. 5 schematically illustrates the depth content as a function of time.

FIG. 4 illustrates the principle of the invention. When an image is shown, for instance of a house 41 against a city sky line 42, at a great depth content d, i.e. a large 3D effect, in FIG. 4 schematically indicated by a large distance between the house and the city sky line in the upper part of the Figure, and a large value for d in the lower part of the image, the image will be perceived as having a great depth. The depth of image perception d' corresponds to the depth content of the actual displayed image. However, when the depth content of the image is reduced, in FIG. 4 schematically indicated by a much smaller distance between the house and the sky line and by a drop in d at time to, the perceived depth d' stays at a high level, and only gradually is reduced. This effect is graphically and schematically illustrated in FIG. 5. Intermittently presenting an image with high depth content d during periods with length $x_1$ and an image with low depth content during periods with lengths $x_2$, provides for an overall average depth content which in this example would be approximately half of the high depth content. The perceived depth content d' is, however, closer to the maximum effect.

In an alternative embodiment of the invention, the depth content is increased upon introduction of new elements into the image. In these embodiments the enhanced 3D effect is presented when it is appreciated most, i.e. when new elements are introduced into the image. New elements could be a new scene, or new elements, such as a car driving into the scene. The 3D effect is by the viewer mentally associated with the new element and will be perceived to persist, even if the actual 3D effect, i.e. the depth content itself, has decreased to a low level. This alternative embodiment is based on the same insight: Temporarily increasing the depth content of the displayed image 'tricks' the viewer into believing that, even when an image of lower 3D effect is subsequently shown, said image has a high depth content.

Figure 6:
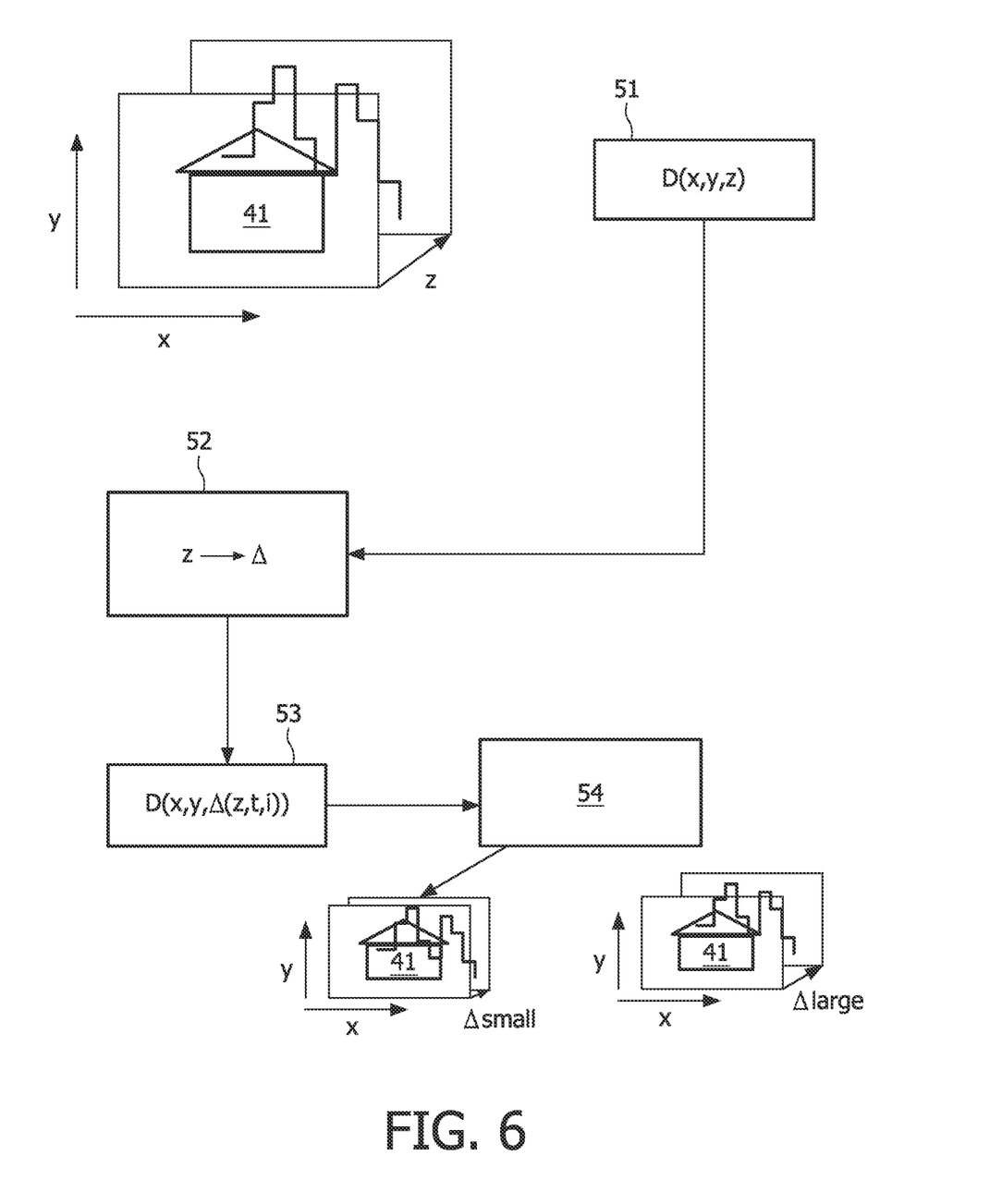
FIG. 6 illustrates schematically a conversion of data before display.

FIG. 6 illustrates schematically a conversion of data before display. The original signal comprises pixel data in which for each pixel or group of pixels x, and y data are given, indicating the position on the screen, and z data, indicating the depth of the original data. This z-data has to be translated into differences between the image presented to the left and right image. If the z-data is ignored, the image presented to the left and right image will be the same, and the image is flat, i.e. perceived as a 2D image. In FIG. 6 this is illustrated schematically as follows. The original image is captured in data D 51 (x,y,z) wherein z stands for the depth. In converter 52 the original data 51 is converted into data wherein the z-coordinate is transformed into data Δ wherein Δ denotes the difference between the image presented to the left and right eye, which corresponds to the parallax angle. If Δ is zero the image is flat. The transformation of z into Δ determines the depth content of the image. Larger differences in parallax angle give a large 3D effect, small differences a small 3D effect. The actual 3D effect can be chosen to be small (Δsmall) or large (Δlarge). The crux of the invention lies in the measure that for relatively short time periods, either intermittently or after introduction of new or certain elements into the image, a large depth content is presented, i.e. in converter 52 to each z a relatively large Δ is coupled, followed by a diminution of the depth of content, i.e. a diminution to a smaller value for Δ. The human brain, being conditioned by the large parallax angle will, however, be tricked into perceiving a large 3D effect, even though the parallax angles are diminished to much smaller values. Δ, and thereby the parallax angle, is therefore a time dependent function of the original values z, wherein a large 3D effect is followed by a small 3D effect. The effect of an increase in 3D reproduction is to trick the viewer into believing that the displayed image has a high depth content.

The relation between the z-values of the original data and the parallax angle as seen on the screen is thus changed intermittently, i.e. it is a function of the time t, wherein a cycle is followed. Alternatively or in addition the depth content may be increased (i.e. increasing the parallax angle for a given value of z) dependent on the change in content of the image, in particular the introduction of novel elements in a scene or the introduction of a new scene. In FIG. 6 this is schematically indicated by the fact that Δ is function of z, of t and of I, wherein t stands for time and I for the introduction of a new element of a new scene. This introduces the most pronounced 3D effect when it is appreciated most, at action moments of a movie or game.

In preferred embodiments the depth content, during application of the enhanced depth effect, when the cue is the introduction of a novel element, is only increased for a part of the image near the newly introduced element. The attention of the viewer is then strongly drawn to the newly introduced element, and the association that is made between depth perception and the element is increased.

It is remarked that in JP 10/040,420 a scheme is described in which, when a novel scene is introduced, and thus possibly an object at a substantially different position in depth than before is shown to which change the eyes have to accommodate, a depth conversion is made to ease the transformation and moderate the change in depth perception over a number of frame times. This is however, although a temporary depth content conversion is used, different from the present invention. In JP 10-040420 temporarily, after an image scene change, a depth content less than the actual depth content is used, followed by increasing the depth content until the depth corresponds to the final value. Once the depth value has reached the final value no further changes are made. That is, there is no diminution.

Figure 7:
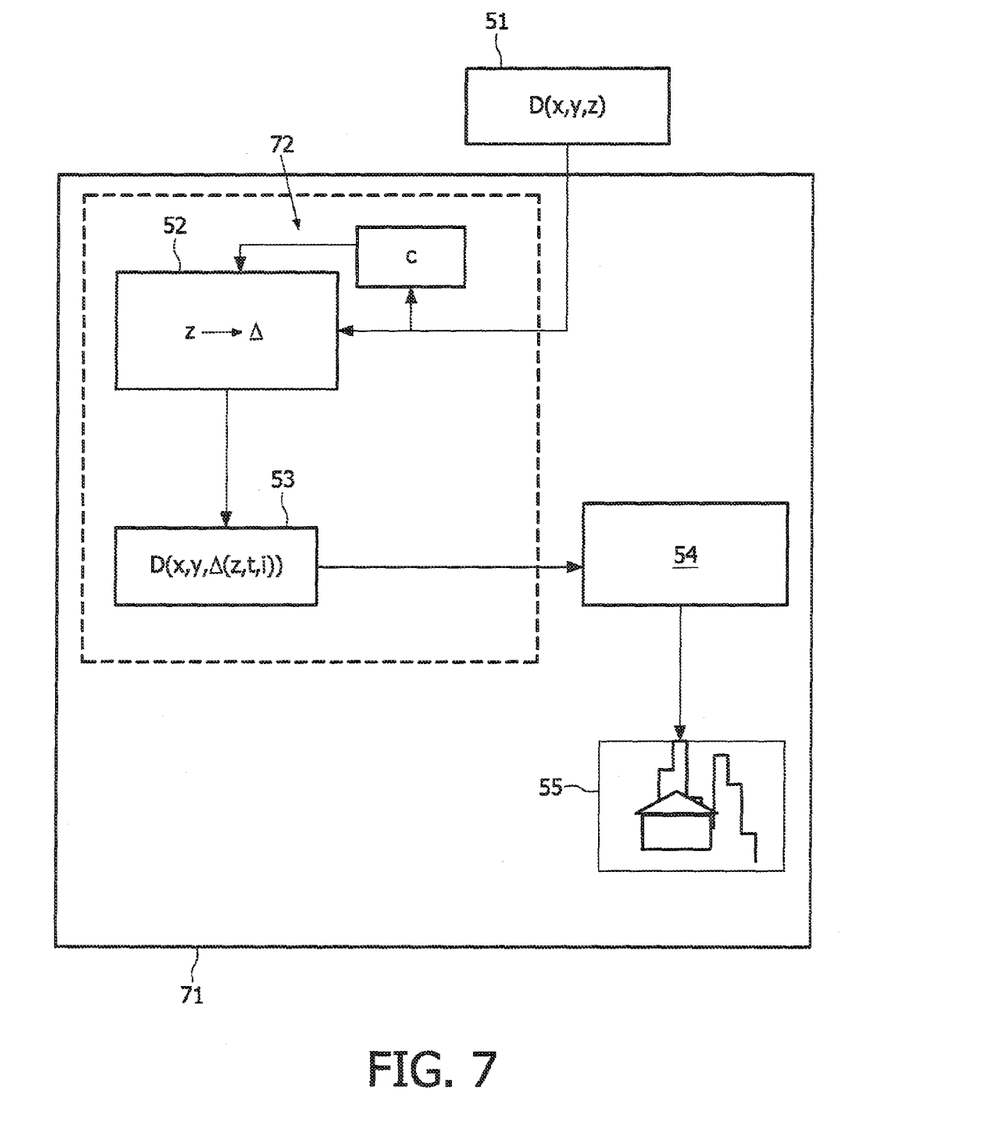
FIG. 7 illustrates a display device in accordance with the invention.

FIG. 7 illustrates a display device in accordance with the invention. The image display device 71 has a display screen 55 and an input for image data D(x,y,z). The image data D(x,y,z) are in converter 52 converted into output data 54 which are so arranged that the depth of content of the image displayed on display screen is intermittently set at a first depth content level, followed by displaying the image at a second depth content level, lower than the first depth content level and/or the depth of content of the displayed image is increased to a first depth content level upon a cue, followed by displaying the image at a second depth content level, lower than the first depth content level. The device comprises a controller c which controls conversion of the data, more in particular it controls the relation between the z values and the Δ values. The controller may have an internal time setting devices which controls the time periods x1 and x2 independently. Alternatively the data stream D(x,y,z) may have a label such as header which comprises values for x1 and x2. In addition or alternatively the controller extracts cues from the image data and sends a triggering signal to converter 52, signaling events such as introduction of new elements of scene changes. The controller c may deduce such cues from the content of the data stream, or the data stream may comprise labels which trigger the controller. The triggering signal 72 send by controller c to converter 52 triggers the converter 52 to set the depth of content of the image or a part of the image at the first, relatively high, level h.

The invention may also be embodied in a converting device even if not comprised in a display device. Such a converter may convert an incoming data stream (for instance from a DVD) and convert it into an output data stream which is then e.g. sent to a storing device, or to a receiver. Basically, such a converting device has the same elements as the display device shown in FIG. 7, but for the display screen part. The converting device may be a stand alone device, i.e. only used for converting the data, or be integrated in a larger device, of which larger devices a display devices form an example. The converting device could also be part of a storing device, which converts as well as stores the converted image data. The invention also relates to an image display data conversion method in wherein 3D image data $D(x,y,z)$ are converted into novel image data $d(x,y,\Delta(x,y,t,i))$ 53 such that the depth of content is temporarily set at a first level where after the depth of content is set to a second level, lower than the first level. The products of such a conversion method are image data wherein the z-coefficient is replaced by a z'-coefficient which takes into account the changes in depth of content in accordance with the invention. The invention is also embodied in a 3D display image data signal in which the depth of content is temporarily set to a first level where after it is set to second level. Whether or not the invention is embodied in a signal is relatively easily checked by displaying a sequence of images (i.e. a video) using a standard display device. The mentioned effect is a dynamic effect and will be present when the video is displayed at normal speed, when the video is played at normal speed the perceived depth of content will be rather large and more or less constant. Displaying still images at much larger time intervals will show that viewers will notice the differences in depth of content.

It is remarked that it is not necessary that the first level is the same for all instances. The idea of the invention is to temporarily increase the depth of content. Within the concept of the invention it is possible that, for instance, upon introduction of novel elements the depth of content is set high, but not equally high for all novel elements. Small, relatively unimportant, novel elements could be associated with a relatively mild increase in depth of content, whereas upon introduction of important new elements a relatively large increase in the depth of content is implemented.

Likewise, when a cyclic variation is used, the cyclic variation could comprise various intermingled cycles, wherein the variation in depth of content of the various cycles may differ.

In short the invention can be described as follows:

In a method and device for generating and/or displaying 3D images the depth content of an image or a part of an image is temporarily increased where after the depth of content is decreased. This temporarily increase of the depth of content renders a large 3D effect to the image or the part of the image to which it has been applied. It has been found that this enhancement effect of an increased 3D effect lingers on in the perception of the viewer even after application. The actual average depth of content can be made relatively low thus reducing fatigue, while the perceived depth of content is relatively high.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data traveling over a network connection—wired or wireless—, or program code on paper. Apart from program code, characteristic data required for the program may also be embodied as a computer program product.

Some of the steps required for the working of the method may be already present in the functionality of the processor instead of described in the computer program product, such as data input and output steps.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

The word "comprising" does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The invention may be implemented by any combination of features of various different preferred embodiments as described above. In particular it is mentioned that any embodiment shown or claimed in relation to an encoding method or encoder has, unless otherwise indicated or impossible, a corresponding embodiment for a decoding method or decoder and such decoding methods and decoder are embodiments of the invention and claimed herewith.

The invention claimed is:

1. A 3D image display method comprising the acts of:
   receiving, by a converter, image data comprising a cue;
   in response to the cue, temporarily setting by, the converter, a depth of content of a part of a displayed image displayed on a screen at a first depth content level without changing the depth of content of remaining parts of the displayed image; and
   after a predetermined time, reducing non-linearly by, the converter, the depth of content of the part of the displayed image from the first depth content level to a second depth content level during a reduction period,
   wherein the cue comprises an introduction of an element in the displayed image, and wherein the part of the displayed image set to the first depth content level is only the part of the image near the newly introduced element, and
   wherein the depth is reduced faster during a first portion of the reduction period than a second portion of the reduction period that follows the first portion.

2. The 3D image display method as claimed in claim 1, wherein temporarily setting act is performed independent of the displayed image.

3. The 3D image display method as claimed in claim 1, further comprising the act of cyclically varying the depth of content with a period of 0.1 to 10 seconds.

4. The 3D image display method as claimed in claim 3, wherein the cyclically varying act changes the depth content in accordance with a cycle wherein during $x_1$ second a part of an image with large depth content is displayed followed by $x_2$ seconds of displaying said part of the image with a lower depth of content, wherein $x_1$ and $x_2$ are 0.1 to 10 seconds.

5. The 3D display method as claimed in claim 4, wherein $x_2$ is equal to or larger than $x_1$.

6. The 3D image display method as claimed in claim 1, wherein the cue further comprises a scene change.

7. A 3D image display device comprising:
   an input for inputting image data comprising depth data and a cue;
   a converter to convert the image data to output data to be sent to a display screen, the output data being so arranged that a depth of content of a part of a displayed image to be displayed on the display screen is temporarily set at a first depth of content level without changing the depth of content of remaining parts of the displayed image, wherein after a predetermined time, the converter reduces non-linearly the depth of content of the part of the displayed image from the first depth content level to a second depth content level during a reduction period; and the display screen for displaying images corresponding to the output data, wherein the cue comprises an introduction of an element in the displayed image, and wherein the part of the displayed image set to the first depth content level is only the part of the image near the newly introduced element, and wherein the depth is reduced faster during a first portion of the reduction period than a second portion of the reduction period that follows the first portion.

8. The 3D image display device as claimed in claim 7, wherein the converter is so arranged that the depth of content is cyclically varied with a period 0.1 to 10 seconds.

9. The 3D image display device as claimed in claim 8, wherein the converter is so arranged that the depth content is changed in accordance with a cycle wherein during $x_1$ second a part of an image with large depth content is displayed followed by $x_2$ seconds of displaying said part of the image with low or no depth of content, wherein $x_1$ and $x_2$ are 0.1 to 10 seconds.

10. The 3D image display device as claimed in claim 7, wherein the display device comprises a controller to extract cues from the image data, and providing a triggering signal to the converter and wherein the converter is arranged for setting the depth of content of the part of the displayed image at the first level upon receipt of the triggering signal.

11. A non-transitory computer readable medium embodying computer instructions which, when executed by a processor, configure the processor to perform the acts of:

receiving image data comprising a cue;

in response to the cue, temporarily setting a depth of content of a part of a displayed image displayed on a screen at a first depth content level without changing the depth of content of remaining parts of the displayed image; and after a predetermined time, reducing non-linearly the depth of content of the part of the displayed image from the first depth content level to a second depth content level during a reduction period, wherein the cue comprises an introduction of an element in the displayed image, and wherein the part of the displayed image set to the first depth content level is only the part of the image near the newly introduced element, and wherein the depth is reduced faster during a first portion of the reduction period than a second portion of the reduction period that follows the first portion.

12. The 3D image display method of claim 1, further comprising the act of intermittently presenting an image with the first depth content during first time periods and an image with the second depth content during second time periods so that an overall average depth content is approximately half of the first depth content.

13. The 3D image display method of claim 1, wherein a transition between the first depth level and the second depth level is gradual.

14. The 3D image display method of claim 1, wherein the predetermined time is included in a header of the image data.

15. The 3D image display method of claim 1, further comprising the act of deducing the cue from content of displayed images.

16. The 3D image display method of claim 1, wherein the cue comprise a label in image data.

17. The 3D image display method of claim 1, wherein the cue comprises an introduction of a plurality of elements in the displayed image, and wherein the method further comprises the act of setting a depth of the plurality of elements to different levels based on importance of the plurality of elements.

18. The 3D image display device of claim 7, wherein the converter intermittently sets an image with the first depth content during first time periods and an image with the second depth content during second time periods so that an overall average depth content is approximately half of the first depth content.

19. The 3D image display device of claim 7, wherein a transition between the first depth level and the second depth level is gradual.

20. The 3D image display device of claim 7, wherein the predetermined time and the cue are included in the image data.

21. The 3D image display device of claim 7, wherein the cue comprises an introduction of a plurality of elements in the displayed image, and wherein the converter sets a depth of the plurality of elements to different levels based on importance of the plurality of elements.

* * * * *